Sept. 4, 1934.  W. W. FERRIS  1,972,479
OPHTHALMIC MOUNTING
Filed Dec. 5, 1932
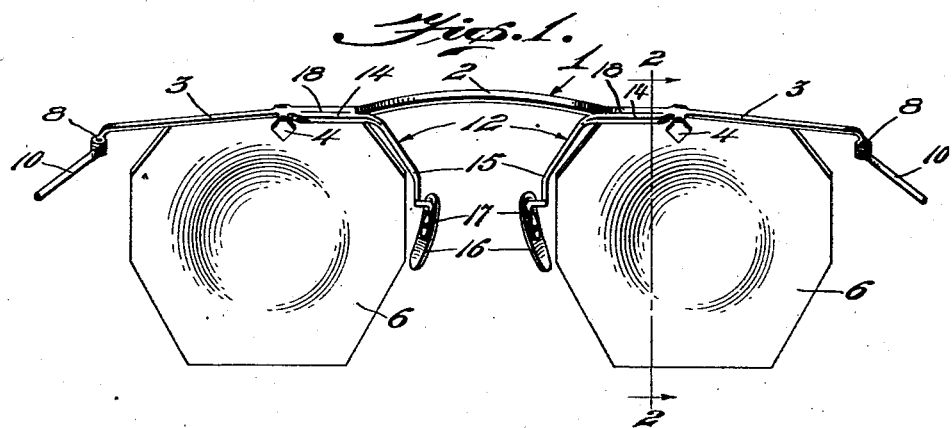
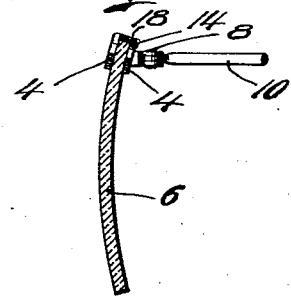
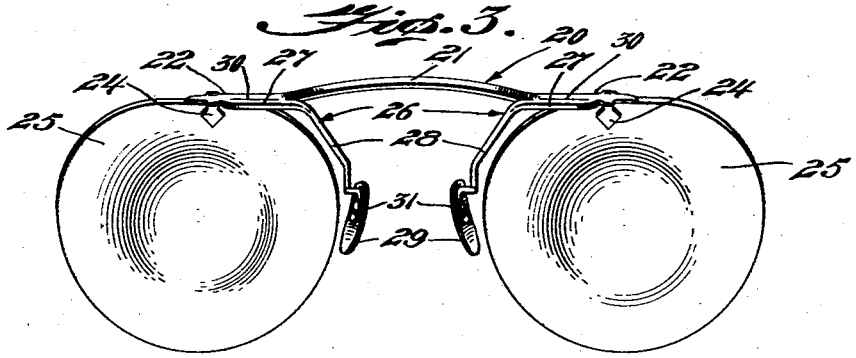
Inventor
William W. Ferris
By Perley H. Plant
Attorney Patented Sept. 4, 1934

1,972,479

UNITED STATES PATENT OFFICE 1,972,479

OPHTHALMIC MOUNTING

William W. Ferris, Providence, R. I.

Application December 5, 1932, Serial No. 645,658

6 Claims. (Cl. 88—42)

This invention relates to an improved ophthalmic mounting adapted for use in connection with spectacles, nose glasses and the like.

In the fitting of spectacles and nose glasses for use by the wearer, the many different facial characteristics require various adjustments, both in the lenses to space them from each other the required distance to conform with the pupillary distance of the eyes, as well as in the nose guards to make them conform with the contour of the nose and properly position the lenses relative to the eyes. In the usual types of mountings for rimless eyeglasses the lenses are so supported from the bridge member as to permit adjustment of the lenses towards and from each other along the line joining the optical centers thereof only through manipulation of the bridge member. Such manipulation of the bridge member usually necessitates further adjustment of the nose guards, which may in turn call for further adjustment of the lenses, thus making necessary a more or less coordinate or interdependent adjustment of the lenses and nose guards before final correct adjustment of these parts is obtained.

One object of the present invention is the provision of a mounting of this character, adapted for use either with spectacles or with nose glasses, so constructed that the lenses may be mounted on the supporting member in the desired position relative to each other to conform with the pupillary distance of the eyes while the nose guards are so supported as to be movable independently of the lenses and thus capable of adjustment to fit the nose of the wearer without interference with the adjustment of the lenses.

Another object of the invention is to provide a mounting of this character for rimless spectacles in which the strain normally imposed upon the lenses in devices of that character is taken up entirely by a continuous supporting member to which the temples are pivoted, thus obviating the danger of breaking the lenses through strain placed thereon in spreading the temples.

Another object of the invention is the provision of a supporting member provided with depending lens clamps whereby the lenses may be connected to the lens clamps so as to be mounted upon the supporting member at variable distances from each other to secure proper positioning of the lenses with respect to the pupillary distance of the eyes.

Another object of the invention is the provision of a mounting of this character adapted for use in spectacles for eliminating strain upon the lenses and thereby preventing the lenses from becoming broken, while at the same time providing a structure in which each lens is connected to the supporting member at a single point thereby avoiding the necessity of making two connections between each lens and the mounting as has been the practice heretofore.

A further object of the invention is the provision of a mounting of this character adapted for use in spectacles whereby the mounting may be formed to fit faces of varying widths while enabling the lenses to be so positioned upon the mounting as to conform with the pupillary distance of the eyes.

A further object of the invention is the provision of a mounting of this character comprising a supporting member, lens clamps and nose guard supports which may be of a substantially integral construction with the parts so arranged relative to each other that suitable adjustments may be made in the nose guard supports and in the mounting of the lenses within the lens clamps so as to adapt the structure to fit the user through a relatively wide range of facial differences.

Other objects and advantages of the invention relate to various improved details of construction and novel arrangements of the parts as will be more fully set forth in the detailed description to follow.

Referring to the drawing:—

Fig. 1 is a front elevational view of the improved mounting showing the same as applied to the spectacle type of eyeglass structure, Fig. 2 is a vertical sectional view taken substantially along the line 2—2 of Fig. 1, and, Fig. 3 is a front elevational view of the improved mounting showing the same in connection with an eyeglass structure of the type adapted to be supported entirely from the nose of the wearer.

In that form of the invention illustrated in Figs. 1 and 2 of the drawing, 1 designates generally a supporting member which may or may not be of integral construction throughout its length.

The supporting member, as shown, comprises a central bridge portion 2 adapted to be positioned above and extend across the nose of the wearer, and opposite end portions 3, each provided with opposed lens clamping members 4 depending therefrom to receive therebetween the edge of a lens 6. Each lens may be secured to the opposed clamping members by an adherent medium or by being secured thereto by a screw or other suitable fastening means passed through the opposed clamping members and the lens after a manner well known in the art. In this form of the construction pivot bearings 8 are carried by opposite ends of the supporting member 1 for providing a pivotal mounting for temples 10 of the usual or any desired construction. Nose guard supports 12, each having a shank portion 14 and a downwardly inclined portion 15, which may be formed integral with or secured to the supporting member 1, and are each adapted to support a nose guard member 16 in position to engage the nose of the wearer. Each nose guard member 16 is shown as being loosely mounted upon one of the downwardly inclined portions 15, as at 17, to better adapt the nose guard for fitting against the side of the nose. When the nose guard supports 12 are formed separately from a supporting member 1, the shank portion 14 of each nose guard support may be brazed or soldered to the supporting member as indicated at 18.

It will be seen that in this form of mounting all strain occasioned by turning the temples 10 about their pivot bearings 8, or brought about in handling or adjusting the spectacles to the face is taken up entirely by the supporting member 1 and is not transmitted to the lenses as in the usual form of rimless spectacle construction wherein each lens is separately connected with the nose guard and a temple supporting member. In this way the danger of breaking the lenses at their points of connection with the nose guard or temple supporting member through strain placed thereon in applying the spectacles to the face or removing them therefrom is eliminated.

It will be noted further that each lens is connected to the mounting at a single point, namely, through the opposed clamping members 4, thus eliminating the necessity of making a plurality of connections for each lens, and by mounting the lenses in the manner shown and connecting each lens to the supporting member at a point located upon or adjacent to the upper edge of the lens, the lenses may be mounted in adjusted relation to each other so that the optical centers of the lenses may be properly set with relation to the pupils of the eyes, and since manipulation of the bridge portion of the supporting member is unnecessary in adjusting the nose guards to the nose the distance separating the optical centers of the lenses remains unchanged and no further adjustment for pupillary distance becomes necessary.

It will be seen, moreover, that with this form of mounting the temple pivots may be so positioned as to fit faces of different widths while the lenses may be so mounted upon the supporting member that the distance separating their optical centers will remain in the desired relation with the pupils of the eyes, and, if desired, the temple pivots may be adjusted through manipulation of the end portions of the supporting member located outwardly of the opposed lens clamps 4 without interfering with the adjustment of the lenses for the pupils of the eyes which has previously been made.

After mounting the lenses in their adjusted positions as above described, the nose guards may be adjusted to fit the nose without effecting any change in the previously adjusted lenses. This by reason of the fact that the nose guard supports are so mounted upon the supporting member that portions thereof are movable without effecting change in the distance separating the optical centers of the lenses. This adjustment of the nose guards may be accomplished by bending the inclined portion 15 of the supports inwardly or outwardly of the plane of the lenses or laterally thereof as may be desired to cause the nose guards 16 to engage the nose properly.

In that form of the invention shown in Figs. 3 of the drawings, 20 designates the supporting member generally, which comprises a bridge portion 21 and oppositely positioned end portions 22. Opposed lens clamps 24 are carried by each end portion 22 and spaced from each other, as shown in Fig. 2, to receive therebetween a lens 25. Each lens 25 may be secured to its clamps 24 by an adherent medium or attached by means of a screw or similar fastening means passed through the lens clamps and lens. Nose guard supports 26, each comprising a shank portion 27 and a downwardly extending portion 28 are adapted to support the nose guards 29 as in the form previously shown. The shank portion 27 of the nose guard support may be formed integral with the supporting member 20 or may be formed separately therefrom and brazed or soldered thereto, as along the line 30. In the present instance the nose guards 29 are loosely connected to the depending portion 28 of the nose guard supports, as indicated at 31, but the nose guards may be pivotally mounted upon the inclined portions 28 and resiliently pressed against the nose after a manner well known in the art.

In this form of the invention the lenses 25 are dependingly mounted upon the supporting member 20, each at a point adjacent to the end portion of the supporting member and through a single point located adjacent to the upper edge of the lens, whereby the lenses may be mounted in suitably adjusted position to cause the distance separating the optical centers of the lenses to correspond with the pupillary distance of the eyes. The downwardly extending portions 28 of the nose guard supports may be bent sufficiently to adjust the nose guards relative to the nose of the wearer.

As in the form previously described, it will be seen that the adjustment of the lenses for pupillary distance is independent of the adjustment of the nose guards and that these adjustments may each be made without requiring readjustment of the other. Moreover, in each of the forms shown the adjustment for pupillary distance may be made in mounting the lenses upon the supporting member without requiring any subsequent manipulation of the bridge member.

In forming the supporting member as employed either in connection with a spectacle or eye-glass mounting, the lens clamps may be formed integral with or secured to the supporting member at points separated from each other by approximately the average pupillary distance of the class of individuals for whose use they are adapted. That is, the average pupillary distance for women being 58 mm., and the average pupillary distance for men being 60 mm., the mountings may be made in two sizes or types having the lens clamps spaced from each other 58 mm. and 60 mm. respectively. In mounting the lenses in the lens clamps, the lenses may be accurately adjusted before attachment to the lens clamps to locate the optical centers of the lenses in the desired relation with the pupils of the eyes in each particular case. While I have shown the improved mounting with each lens attached to the supporting member at a point approximately directly over the focal center of the lens in order to illustrate one form of the mounting showing the parts arranged in symmetrical relation, it is to be understood that each lens may be attached to the supporting member at any desired point adjacent to the upper edge of the lens or above the horizontal axis of the lens.

In each form of the invention as shown herein, the nose guard supports are provided with portions extending downwardly from the supporting member which are capable of being bent to permit a relatively wide swing of the nose guards in or out from the plane of the lenses in effecting the desired adjustment to position the lenses nearer to or farther from the eyes, or laterally of the plane of the lenses to secure proper engagement of the nose guards with the nose of the wearer.

What I claim is:—

1. In an ophthalmic mounting, a pair of lenses, a continuous lens supporting member located entirely above the lenses and provided with fixed depending lens clamps arranged in pairs, the pairs of lens clamps being spaced from each other a distance approximating the pupillary distance of the eyes, each pair of opposed lens clamps being adapted for adjusted attachment to a lens for locating the lenses at a suitable distance from each other to bring the optical centers of the lenses into the desired relation with the pupils of the eyes and depending nose guard supports integrally united with said supporting member and having the end portions converging downwardly in spaced relation with the lenses for individual adjustment independently of movement of the lenses.

2. In an ophthalmic mounting, a pair of lenses, a continuous supporting member located above the lenses and provided with pairs of spaced depending lens clamps carried by the supporting member and having end portions supporting temple pivots and movable to adjust the temple pivots longitudinally of the supporting member to fit faces of different widths, one pair of said clamps being spaced from the other pair a distance substantially equal to the pupillary distance of the eyes, said opposed clamps being mounted for adjusted attachment to the lenses at points substantially coincident with the vertical axes of the lenses, temples pivotally mounted upon said temple pivots outwardly of the lenses, and nose guard supports integrally united with said supporting member and depending from said supporting member between and in spaced relation with the lenses.

3. In an ophthalmic mounting, the combination with a pair of lenses, of a continuous lens supporting member provided with depending lens clamps arranged in pairs, said pairs of lens clamps being integrally united with the supporting member and spaced from each other a distance approximating the pupillary distance of the eyes and adapted for adjusted attachment with the lenses to bring the optical centers of the lenses into the desired relation with the pupils of the eyes, and nose guard supports each having a shank portion integrally united with the supporting member and a depending portion inclined with respect to the supporting member, the depending portions of said nose guard supports being spaced from the lenses and movable relative thereto throughout their extent.

4. In an ophthalmic mounting, the combination with a pair of lenses, of a continuous lens supporting member provided with lens clamps arranged in pairs, said pairs of lens clamps being integrally united with the supporting member and spaced from each other a distance approximating the pupillary distance of the eyes, each pair of lens clamps being adapted for adjusted attachment with a lens to bring the optical center of each lens into the desired relation with the pupil of each eye, nose guard supports each having a shank portion integrally united with the supporting member and a depending portion inclined with respect to the supporting member, the depending portions of said nose guard supports being spaced from the lenses and movable relative thereto throughout their extent, and temples pivotally secured to the ends of said supporting member outwardly of the lenses.

5. In an ophthalmic mounting, a pair of lenses, a continuous supporting member provided with opposed lens clamps arranged in pairs and depending from opposite side edges of said supporting member for attachment to said lenses, said supporting member being also provided with downturned end portions providing temple pivots spaced from the outer edges of the lenses and movable longitudinally of the supporting member to vary the position of the temple pivots, temples pivotally secured to said temple pivots, and nose guard supports each provided with a shank portion integrally united with said supporting member and a portion extending downwardly from the supporting member and spaced from the adjacent lens and capable of adjustment relative thereto.

6. In an ophthalmic mounting, a pair of lenses, a continuous supporting member provided with means for attachment to each lens at a single point located at the upper edge of the lens and having downturned end portions extending beyond the lenses and adapted to be moved towards and from the lenses, temple pivots carried by said downturned end portions, and temples pivotally secured to said temple pivots at points beyond the outer edges of the lenses whereby longitudinal adjustment of the temple pivots relative to the supporting member may be effected without interference with the position of the lenses relative to each other.

WILLIAM W. FERRIS.